July 5, 1960 E. C. GREANIAS 2,944,217

SIGNAL TRANSLATING APPARATUS

Filed Nov. 30, 1955 2 Sheets-Sheet 1

*INVENTOR.*
EVON C. GREANIAS
*BY*
Dewey J. Cunningham
ATTORNEY

INVENTOR.
EVON C. GREANIAS
BY
Dewey J Cunningham
ATTORNEY

United States Patent Office 2,944,217

Patented July 5, 1960

2,944,217

SIGNAL TRANSLATING APPARATUS

Evon C. Greanias, Vestal, N.Y., assignor to International Business Machines Corporation, New York, N.Y., a corporation of New York Filed Nov. 30, 1955, Ser. No. 550,024

11 Claims. (Cl. 328—2)

The present invention relates to signal translating apparatus, particularly such apparatus as is used in handling signals obtained from devices which are scanning graphic data.

While there are a number of methods used in scanning graphic data on a record medium, one of the methods which appears to be the fastest includes the use of a light sensitive device such as a photomultiplier. In such a method, the graphic data, which may be characters in the form of code marks or alpha-numeric information, is scanned by means of a suitable scanning apparatus. Such apparatus may be in the form of a mechanical scanner or it may be a cathode ray apparatus such as a "flying spot" scanner or an iconoscope. In any event, some form of light sensitive means must be used to detect gradations of light which result from scanning the character. The output signals from the light sensitive means normally have an instantaneous amplitude which is a function of the amount of light viewed thereby.

A serious limitation in the above type of apparatus is the relatively poor signal which is frequently encountered with low contrast copy. That is, the characters may be anywhere from a dark color which contrasts greatly with the background to a very light color which tends to merge with the background. At other times both the background and characters may vary in density at the same time. In many cases, contrast between the character and its background may be such as to permit an easy distinction to the human eye, but to the light sensitive device, the distinction may be only slight. In order to match the ability of the human eye to detect subtle contrasts, a scanning system such as that under discussion must be equipped to compensate for variations in the general density level of the data. It must, in effect, be able to indicate that character lines are "black" and the background is "white" for overlapping ranges of viewed light.

A common technique for discriminating black and white signals, i.e., those from the character and those from the background, is to establish a discriminating or clipping voltage level which must be exceeded by the analog signal from the light sensitive device when an area of the character is scanned. Unfortunately, a single discriminating level is at most a compromise, and may result in passing too much undesirable data or not enough of the desirable data.

The present invention has as one of its objects the provision of an improved signal translating apparatus for signals obtained from light sensitive devices used in scanning graphic data.

Another object of the invention is to furnish an improved signal translating apparatus for obtaining more usable and reliable information from apparatus which is scanning graphic data.

Still another object of this invention is to provide an improved circuit for handling signals obtained in scanning graphic data such as characters, said circuit producing reliable signals from those signals produced in scanning characters having subtle contrast with the background upon which they are positioned.

A further object of the instant invention is to provide a signal translating circuit for receiving signals produced by light sensitive devices which are scanning graphic data, said signal translating circuit compensating for variations in the general density level of the data.

A still further object of the invention is to provide a signal translating circuit as described above in which a dynamic discriminating or clipping level is established for the signals received thereby.

Other objects of the invention will be pointed out in the following description and claims and illustrated in the accompanying drawings, which disclose, by way of examples, the principle of the invention and the best mode, which has been contemplated, of applying that principle.

Briefly, the present invention comprises a first integrating circuit which is adapted to receive the amplified video signal from the photomultiplier through a first gating circuit. This gating circuit allows the integrating circuit to follow increases as well as decreases in the video signal. A cathode follower is used to couple the output from the integrating circuit to a mixing circuit which is illustrated in the present instance as a voltage divider. The cathode of the cathode follower is connected to one end of said voltage divider. At the mid-point of the voltage divider a connection is made to discriminator means which may be a clipping circuit, the potential at said mid-point being used to control the clipping level within said circuit. The video signals previously referred to are also fed to said clipping circuit so that uniform output signals are derived therefrom when the video signals exceed the clipping level. These uniform amplitude signals are adapted to serve as the input to the recognition circuit of a character sensing apparatus and may be inverted if desired before being sent to said recognition circuit. The output from the clipping circuit is capacitively coupled to a clamping circuit which references the signals to ground. A second gating circuit is used to couple the clamped signals to a second integrating circuit, the output from said second integrating circuit being used to control the other end of said voltage divider, i.e., the mixing circuit. Thus, the first integrating circuit integrates positive video signals which vary in amplitude and time while the second integrating circuit integrates the clipped or uniform amplitude negative video signals. The outputs of the two integrating circuits are combined and used to control the clipping level in the clipping circuit. The first integrating circuit causes the clipping level to rise as the density or duration of the data increase, and the second circuit causes the level to fall as the duration alone increases. In this manner it is possible to cause the clipping level to be properly set for data of varying degrees of density as well as data having variable length portions to be scanned.

Figure 1:
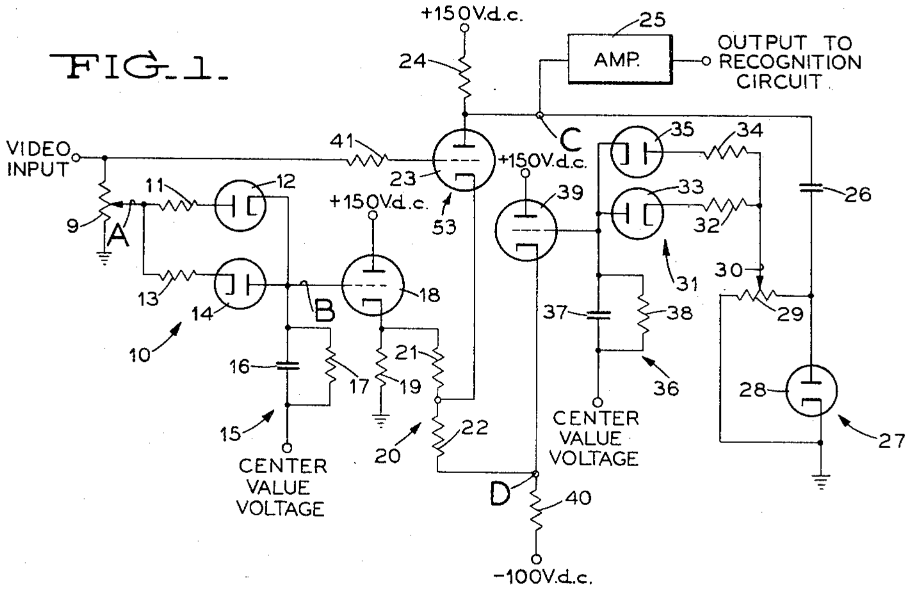
Fig. 1 is a schematic diagram of the present invention.

Referring now to Fig. 1 of the drawings, the video signals from the photomultiplier performing the scanning of the graphic data have been amplified, filtered and suitably shaped and are connected through a low impedance output circuit, such as a cathode follower, as the input to a voltage divider 9, the variable tap thereof being connected to a gating circuit 10. This gating circuit, which will hereinafter be referred to as the first gate or first gating circuit, comprises two separate paths, one path for conducting signals in a forward direction and another path for conducting in a reverse direction. The path for conducting signals in a forward direciton comprises a resistor 11 and a vacuum diode 12, one end of said resistor 11 being connected to receive said video signals and the other end being connected to the plate of diode 12. The path for conducting in the reverse direction comprises a resistor 13 and a vacuum diode 14, one end of resistor 13 being connected to receive said video signals and the other end being connected to the cathode of diode 14. The plate and cathode of diodes 14 and 12, respectively, are commoned and connected as the input to an integrating circuit 15.

The integrating circuit 15, which will hereinafter be referred to as the first integrating circuit, comprises a capacitor 16 having one plate thereof connected to said first gating circuit and the other plate thereof connected to a reference potential, which may be referred to as a center value potential. The center value potential is the mid-value of the signal range minus the cathode follower bias in the afore-mentioned low impedance output circuit. This potential is important only when the circuit is first turned on since this is the clipping level before capacitors 16 and 37 can acquire their charges. A leak resistor 17 is connected in shunt with capacitor 16.

It will be seen from the above description that if the potential at point A is higher than that at point B, diode 12 will conduct and allow capacitor 16 to charge at a rate determined by the values of resistor 11 and a capacitor 16. Should point A be lower in potential than point B, diode 14 will conduct and tend to discharge capacitor 16 at a rate determined by the values of resistor 13 and capacitor 16. The use of a forward charging path and a reverse discharging path allows the integrator to follow increases as well as decreases in the video signals.

The plate of the capacitor opposite to that connected to the center value reference potential is connected to the grid of a vacuum triode 18. This triode is connected as a cathde follower, the plate being connected directly to a positive source of D.C. reference potential, herein illustrated as +150 v. D.C., and the cathode being connected through a resistor 19 to ground potential. The cathode of the triode 18 is connected as one input to a mixing circuit 20, said mixing circuit being illustrated as a voltage divider comprising resistors 21 and 22. The potential at the mid-point of these two resistors is used to control the clipping level in a clipping circuit, illustrated generally by reference numeral 53. The illustrated clipping circuit comprises a vacuum triode 23 which is normally cut off by proper choice of circuit parameters and whose cathode is connected to said mid-point and whose control grid is connected to receive the video signals through resistor 41 which limits the positive signals at the grid by drawing small amounts of grid current when the grid exceeds the instantaneous cathode voltage. The plate of the triode is connected as an amplifier through resistor 24 to a positive source of D.C. potential, herein illustrated as +150 D.C., to amplify and invert the portion of the signals that exceeded the clipping level and have been grid limited.

Since the triode 23 operates to limit the grid voltage by virtue of grid current flowing through the limiting resistor 41, the tube will conduct when the grid rises above the cutoff voltage, but the variation of the grid signal over and above the instantaneous cathode voltage will have little or no effect, due to the limiting action of the grid current creating a voltage drop across the limiting resistor.

The plate current and hence the output voltage can vary by a small amount after the input signal has gone above the instantaneous cathode voltage, in view of the rise (or fall) in the cathode voltage during a signal input, but this variation will be relatively small, since the parameters are arranged so that the tube is essentially operating at saturation when in full conduction. Moreover, the variation in amplitude from beginning to end of the output pulse is relatively negligible in comparison with the overall amplitude, so that the output pulses are substantially constant in amplitude.

The potential at the plate of triode 23 is connected to an inverter 25 which serves to further amplify and invert the uniform amplitude signals supplied thereto. The output from the inverter is adapted to be supplied to a suitable recognition circuit which interprets the signals for a unit of data and identifies said unit.

It will be noted that the first integrator will supply substantially the same output for a large amplitude short duration signal as for a shorter amplitude longer duration signal, providing the areas beneath the signal curves are substantially the same. Thus, the clipping level for both video signals will be the same. This is undesirable since this setting for the clipping level may be such that it is generally low for high amplitude signals and generally high for low amplitude signals.

To overcome the above situation, the uniform amplitude negative signals from the clipping circuit are coupled by a capacitor 26 to a clamping circuit illustrated generally by reference numeral 27. This clamping circuit comprises a vacuum diode 28 having its plate connected to receive the signals from capacitor 26 and its cathode connected to ground potential, and a potentiometer 29 in shunt with said diode. The clamping circuit causes the highest potential signals supplied thereto to be referenced to ground. Thus, the remaining signals will vary below ground potential.

A slider 30 on potentiometer 29 is adapted to pick off an adjustable amount of the clamped signals and supply them to a second gate illustrated generally by reference numeral 31. This gate comprises a forward conducting path, including a resistor 32 and a vacuum diode 33, and a reverse conducting path which includes a resistor 34 and a vacuum diode 35. It will be seen that the forward and reverse conducting paths of the second gate are the reverse of the forward and reverse conducting paths, respectively, of the first gate, this being due to the fact that the second gate is dealing with negative signals while the first gate was dealing with positive signals.

In detail, one end of resistor 32 is connected to slider 30 and the other end thereof is connected to the cathode of diode 33. One end of resistor 34 is connected to slider 30 and the other end thereof is connected to the plate of diode 35. The plate and cathode of diodes 33 and 35, respectively, are commoned and supplied to a second integrating circuit 36, the last-named circuit comprising a capacitor 37 having a leak resistor 38 in shunt therewith. One plate of the capacitor is connected to the second gate and the other plate is connected to a center value potential.

The said one plate of the capacitor is connected to the control grid of a vacuum triode 39 which is connected as a cathode follower. That is, the plate of the triode is connected to a positive source of D.C. potential, herein illustrated as +150 v. D.C., and the cathode is connected through a resistor 40 to a negative source of D.C. potential, herein illustrated as −100 v. D.C. The output from triode 39 is taken from the cathode thereof and is used as the other input to mixer 20, the input connection being made to the lower end of resistor 22. Since the second input to the mixer circuit is normally negative with respect to the first input thereto, the output potential from the mixer will have an amplitude somewhere between the two inputs. The amplitude of the mid-point potential, in relation to the first and sceond input potentials, is determined by the values of resistors 21 and 22. The amount of feedback via the second integrating circuit is adjustable by means of slider 30 on potentiometer 29.

The operation of the present invention will now be described in conjunction with the waveforms shown in Fig. 3. These waveforms are illustrative of signals produced at different points in the circuit shown in Fig. 1 when scans are made through the character "E" shown in Fig. 2. It will be noted that the background for the character shown in Fig. 2 varies in density from the left side to the right side, as does the ink density of the character outline. While such gradations of background density and character ink density are not unusual, the primary reason for the illustration is to show how the present invention would react to similar gradations over an entire document. For example, a document containing sixty characters in a line to be read may have a background density which shades from very dark at the first character to very light at the last character. Similarly the ink density of the first character may be quite dark and the last character may be quite light. Thus, even though the contrast between character outline and background density may remain about the same throughout the line of characters, the amplitude level for the background signal will gradually decrease from the first to the last character. This means that it is entirely possible for the amplitude of the background signal for the first character to be more positive than the amplitude of the character outline signal for the last character. Thus, a clipping level which would be entirely suitable for the first character would completely eliminate the signals for the last character.

Figure 2:
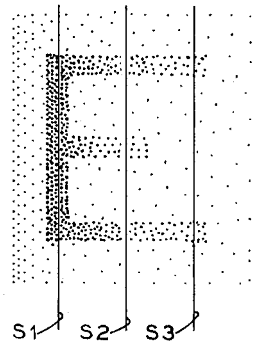
Fig. 2 shows a sample character in which the general density level varies over the scanning area.
Figure 3:
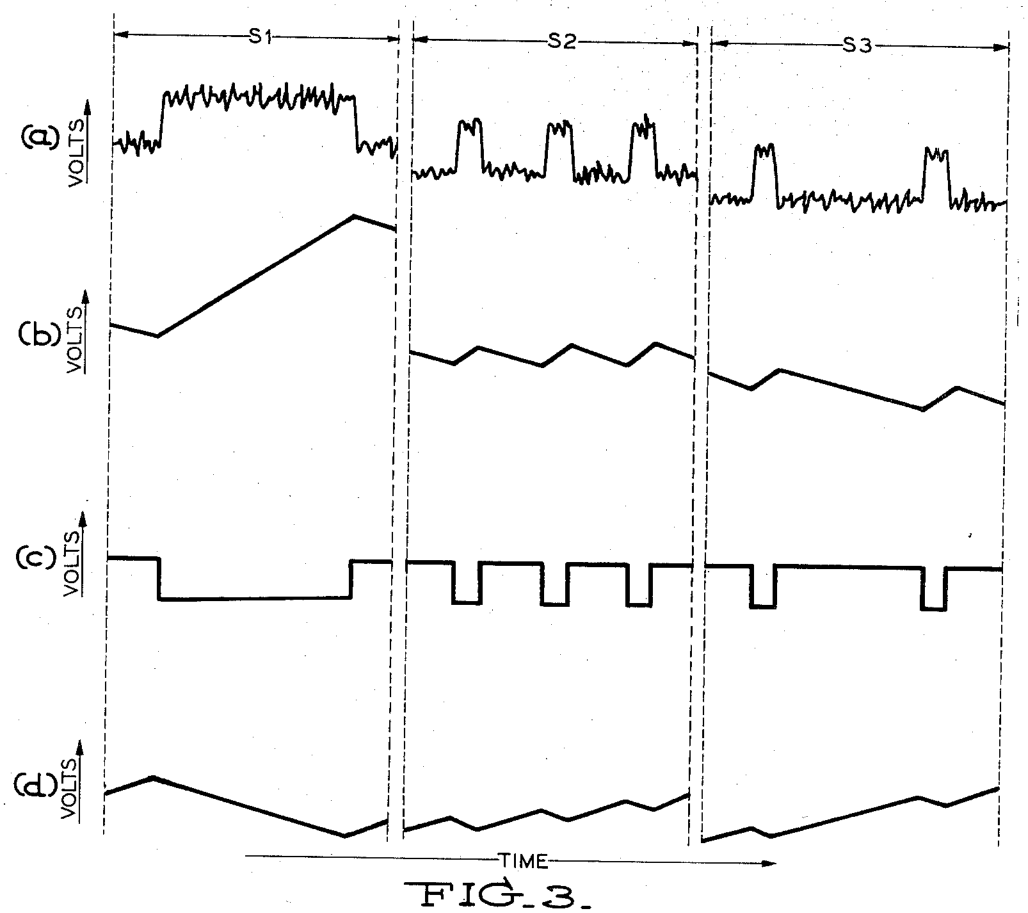
Fig. 3 shows a plurality of somewhat idealized waveforms which might be produced at different points in the circuit of Fig. 1 when scanning the character shown in Fig. 2 as indicated.

Referring to Fig. 3, the waveform shown at (*a*) is illustrative of the video signal which may be produced from a photomultiplier by scans S1, S2 and S3, occurring at spaced intervals during the scanning of the character "E" shown in Fig. 2. It will be understood that these three scans are illustrative, there being as many as twenty or thirty scans through the character in actual practice. The reference levels for the waveforms shown at (*a*) in Fig. 3 are zero light condition, which is the upper level, and maximum light condition, the lower level. It will be noted that the background signals for the three successive scans vary in potential from scan to scan. This variation is due to the varying density background. The waveforms shown in Fig. 3 at (*a*) appear at point A in Fig. 1. These signals are integrated by integrator 15, the waveforms shown at (*b*) in Fig. 3 appearing at point B in Fig. 1. As shown, the integrator output rises as long as a character signal appears, this rise being allowed by the conduction of diode 12. However, when the video signal drops off to the background level, diode 14 conducts and slowly lowers the integrator output. The time constant of the charging path including resistor 11 and capacitor 16 and the time constant of the discharging path including resistor 13 and capacitor 16 are matters of design which depend primarily upon the scanning frequency used. In practice, with typewritten characters, the positive charging path time constant was equal to one and one-half scan periods, and the negative path time constant equaled seven scan periods.

The output potential from the first integrating circuit is passed through a cathode follower to a mixer circuit 20 and serves as one of the inputs thereto. The output from the mixer circuit serves to set the clipping limits in a clipping circuit which receives the video signals. The clipping circuit in the present instance has been illustrated as a vacuum triode whose cathode potential is determined by the output of the mixer and whose control grid receives the video signals. The output signals from the clipping circuit are inverted and of constant amplitude and variable width. For the three scans through the character "E" shown in Fig. 2, the clipping circuit produces waveforms such as those shown at (*c*) in Fig. 3. Fig. 3 shows at (*d*) waveforms supplied from the second integrator to the mixer for the scans illustrated in Fig. 2.

Taking another example, if a first video signal supplied to the clipping circuit has a time duration of one-tenth scan and an amplitude of twenty volts, the output from the clipping circuit might be a pulse having a time duration of one-tenth scan and an amplitude of four volts. A second video signal may be of one-half scan duration and only four volts in amplitude. The output from the clipping circuit for the second video signal would be nearly identical with the input signal. This example serves to point up one of the reasons for providing a feedback signal which serves as the second input to the mixer circuit. It will be seen that the first integrating circuit receiving the two signals will produce the same change in potential for each signal since the voltage-time integrals of both signals are the same. Thus, both signals would tend to cause the same clipping level to be set. However, it is obvious that the clipping level should be higher for the first video signal than for the second video signal. It is for this reason that the uniform amplitude output signals from the clipping circuit are clamped to ground and integrated in the second integrator circuit 36. The potential at the second integrator is now used as the other input to the mixer circuit to oppose the input from the first integrator.

Taking the example of the first and second video signals mentioned above, the feedback to the mixer from the second integrating circuit for the first signal will be small, since only a constant amplitude signal of one-tenth scan duration is integrated. The effect on the mixer of the feed-back signal is to subtract little from the input thereto from the first integrating circuit. This allows the clipping level to remain higher as is desired. The output from the second integrating circuit for the second signal in the example above will be large, since the amplitude thereof is the same and the duration is one-half scan. This means that a more negative signal will be applied to the mixer from the second integrating circuit, thus causing the output from the mixer to be lower in amplitude. This reduces the clipping level as it should be for lower amplitude video signals.

Figure 4:
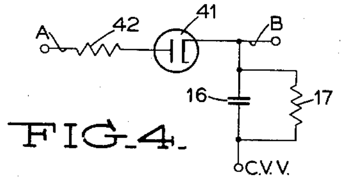
Figs. 4, 5 and 6 show modified forms of the gating circuit used in the present invention.
Figure 5:
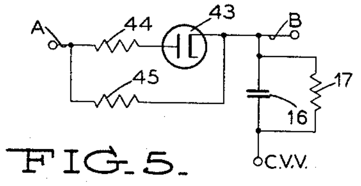
Figure 6:
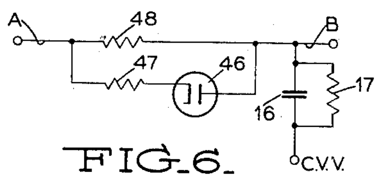

Figs. 4, 5 and 6 each show a modified form of gating circuit which may be used in lieu of gating circuits 10 and/or 31 shown in Fig. 1. Each of the modifications are shown for connection between points A and B in Fig. 1, but it will be understood that it may equally be used between slider 30 and the control grid of triode 39. The Fig. 4 gating circuit utilizes a single diode 41 whose plate may be connected to point A, for example, by a resistor 42, the cathode of diode 41 being connected to point B. The operation of the Fig. 4 gating circuit is such that during periods when the video input signal at point A is sufficiently higher than the potential at point B to allow diode 41 to conduct, capacitor 16 will be charged at a rate determined by the value of resistor 42 and capacitor 16 as well as the value of resistor 17. The value of resistor 17 may be chosen for use with the Fig. 4 gating circuit such that it will tend to discharge capacitor 16 more rapidly than it did with the Fig. 1 gating circuit, so that during periods when the video signal at point A is not sufficiently higher than the potential at point B, the discharge of capacitor 16 through resistor 17 will lead to a somewhat similar result to the discharge action performed in the Fig. 1 circuit by diode 14 and resistor 13. In the Fig. 1 circuit the value of resistor 17 was chosen to be so high that it had little effect on the charging and discharging time constants.

Fig. 5 shows a gating circuit which comprises a diode 43 whose plate is connected through a resistor 44 to point A and whose cathode is connected to point B. A resistor 45 is arranged in shunt with resistor 44 and diode 43. It is noted that this circuit differs from the Fig. 1 circuit in that a diode is left out of the lower conducting path. The time constant for charging capacitor 16 is determined by the parallel resistance of resistors 44 and 45 and the value of capacitor 16. The discharging time constant is determined by the values of resistor 45 and capacitor 16. The values of resistors 44 and 45 may be chosen to provide substantially the same charge and discharge periods as in the Fig. 1 circuit. The value of resistor 17 is chosen similar to that in the Fig. 1 circuit.

Fig. 6 shows a gating circiut which comprises a diode 46 whose cathode is connected by means of a resistor 47 to point A and whose plate is connected to point B. A resistor 48 is arranged in shunt with resistor 47 and diode 46. This circuit differs from the Fig. 1 circuit in that a diode is eliminated from the upper conducting path. The time constant for charging capacitor 16 is determined by the values of resistor 48 and capacitor 16 while the time constant for discharging the capacitor is determined by the parallel resistance of resistors 47 and 48 and the value of capacitor 16.

By way of further comparing the various forms of gating circuits, it will be noted that in the Fig. 1 circuit, the charging period may be more or less than the discharging period. In Figs. 4 and 5, the charging period will be less than the discharging period, while in the Fig. 6 circuit the reverse is true.

From the above-detailed description of the present invention it will be apparent that I have produced an improved signal translating circuit. This invention will automatically control the clipping limits to be applied to video signals produced by a light sensitive device which scans graphic data. The clipping limits are adjusted to follow the general density level of the data being scanned. A feed-back circuit arrangement is provided to lower the clipping limits for low amplitude signals having a relatively long duration and to allow the clipping limits to be higher for high amplitude signals having a relatively short duration.

The specific integrating, mixing and discriminating circuits which are illustrated are shown by way of example only, it being understood that other types of circuits capable of performing similar functions may be used.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a signal translating apparatus for video signals produced by light sensitive means scanning graphic data, a clipping circuit having first and second input terminals, said first input terminal being connected to receive said video signals, said clipping circuit including means responsive to a control signal supplied to said second input terminal for determining which of said video signals will produce output signals, and means including integrating means connected to receive said video signals for generating said control signal.

2. In a signal translating apparatus for video signals produced by light sensitive means scanning graphic data, a clipping circuit having first and second input terminals, said first input terminal being connected to receive said video signals, said clipping circuit including means responsive to a control signal supplied to said second input terminal for determining which of said video signals will produce output signals, gating means connected to receive said video signals and means including integrating means in circuit with said gating means for generating said control signal.

3. A signal translating circuit for video signals produced by light sensitive means scanning characters, said circuit being arranged to apply a variable clipping level to said signals as a function of variations in general density level of the characters and their background, a clipping circuit arranged to receive said video signals and including means responsive to a control signal for determining which of said video signals will produce output signals, and means for generating said control signal comprising a gating circuit having input and output connections and including separate forward and reverse conducting paths, each of said paths including a resistor, one or the other of said paths conducting when the potential at said input connection is higher or lower, respectively, than the potential at said output connection, said input connection being connected to receive said video signals, a capacitor having one side thereof connected to a reference potential and the other side connected to said output connection, and means for coupling the said other side of said capacitor to said clipping circuit.

4. A signal translating circuit for video signals produced by light sensitive means scanning characters, said circuit being arranged to apply a variable clipping level to said signals as a function of variations in general density level of the characters and their background, a clipping circuit arranged to receive said video signals and including means responsive to a control signal for determining which of said video signals will produce output signals, and means for generating said control signal comprising first and second integrating means, means for coupling said first and second integrating means to respectively receive said video signals and said output signals, and mixer means connected to receive the outputs from said first and second integrating means and supplying an output which is the control signal for said clipping circuit.

5. In a signal translating apparatus for video signals produced by a photomultiplier which is scanning graphic data, said video signals varying in magnitude as the amount of light viewed thereby varies, a clipping circuit arranged to receive said video signals and to produce output signals of substantially uniform amplitude from those video signals which exceed an instantaneous clipping level, said clipping circuit including means for providing a varying clipping level in response to a control signal, and circuit means connected to receive said video signals and said output signals for generating said control signal.

6. In a signal translating apparatus for video signals produced by a photomultiplier which is scanning graphic data, said video signals varying in magnitude as the amount of light viewed thereby varies, a clipping circuit arranged to receive said video signals and to produce output signals of substantially constant amplitude from those video signals which exceed an instantaneous clipping level, said clipping circuit including means for providing a varying clipping level in response to a control signal, a first circuit means connected to receive said video signals and a second circuit means connected to receive said output signals, both said first and second circuit means including means for integrating the signals supplied thereto, and mixer means connected to receive the output signals from said first and second circuit means for producing said control signal.

7. In a signal translating apparatus for video signals produced by a photomultiplier which is scanning graphic data, said video signals varying in magnitude as the amount of light viewed thereby varies, a clipping circuit arranged to receive said video signals and to produce output signals of substantially constant amplitude from those video signals which exceed an instantaneous clipping level, said clipping circuit including means for providing a varying clipping level in response to a control signal, a first circuit means connected to receive said video signals and a second circuit means connected to receive said output signals, both said first and second circuit means including means for integrating the signals supplied thereto, and mixer means connected to receive the output signals from said first circuit means in opposition to the output signals from said second circuit means for producing said control signal.

8. In a signal translating apparatus for video signals produced by light sensitive means scanning graphic data, a clipping circuit arranged to receive said video signals and including means responsive to a control signal for determining which of said video signals will produce output signals, and means including integrating means connected to receive said video signals and said output signals for generating said control signal.

9. In a signal translating apparatus for video signals produced by light sensitive means scanning graphic data, a clipping circuit arranged to receive said video signals and including means responsive to a control signal for determining which of said video signals will produce output signals, gating means connected to receive said video signals and said output signals, and means including integrating means in circuit with said gating means for generating said control signal.

10. A signal translating circuit for video signals produced by light sensitive means scanning characters, said circuit being arranged to apply a variable clipping level to said signals as a function of variations in general density level of the characters and their background, a clipping circuit arranged to receive said video signals and including means responsive to a control signal for determining which of said video signals will produce output signals, and means for generating said control signal comprising a gating circuit having input and output connections and including separate forward and reverse conducting paths each including a resistance element, one or the other of said paths conducting when the potential at said input connection is higher or lower, respectively, than the potential at said output connection, said input connection being connected to receive said video signals, a capacitor having one side connected to a reference potential and the other side connected to said output connection, each of said paths in combination with said capacitor having predetermined integrating time constants, and means for coupling the other side of said capacitor to said clipping circuit.

11. In a signal translating apparatus, an input terminal adapted to be connected to a source of video signals produced by light sensitive means scanning graphic data, a discriminator circuit connected by means of a first circuit path to said input terminal to receive video signals from the source and including means responsive to a control signal for determining which of said video signals will produce output signals, and circuit means connected between said input terminal and said discrimnator circuit by means of a second circuit path separate from said first path and responsive to said video signals for generating said control signal.

References Cited in the file of this patent

UNITED STATES PATENTS

| | | |
|---|---|---|
| 2,469,860 | Cockrell | May 10, 1949 |
| 2,495,826 | Schock | Jan. 31, 1950 |
| 2,497,693 | Shea | Feb. 14, 1950 |
| 2,640,965 | Eaglesfield | June 2, 1953 |
| 2,675,473 | Femmer | Apr. 13, 1954 |
| 2,709,716 | Haller | May 31, 1955 |
| 2,711,494 | Westerfield | June 21, 1955 |